(12) United States Patent
Zhang et al.

(10) Patent No.: US 11,385,498 B1
(45) Date of Patent: Jul. 12, 2022

(54) MURA-COMPENSABLE DIRECT-LIT MINI-LED BACKLIGHT MODULE

(71) Applicant: SHENZHEN LONGLI TECHNOLOGY CO., LTD., Guangdong (CN)

(72) Inventors: Xiaoqi Zhang, Guangdong (CN); Yi Peng, Guangdong (CN); Shiqiang Zhuang, Guangdong (CN); Xinli Wu, Guangdong (CN); Xiaoxia Lv, Guangdong (CN); Yan Li, Guangdong (CN)

(73) Assignee: SHENZHEN LONGLI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/308,987

(22) Filed: May 5, 2021

(30) Foreign Application Priority Data

Jan. 25, 2021 (CN) .......................... 202110098919.9
Jan. 25, 2021 (CN) .......................... 202110098922.0

(51) Int. Cl.
*G02F 1/13357* (2006.01)

(52) U.S. Cl.
CPC .. *G02F 1/133603* (2013.01); *G02F 1/133605* (2013.01); *G02F 1/133606* (2013.01)

(58) Field of Classification Search
CPC ......... G02F 1/133603; G02F 1/133605; G02F 1/133606; G02F 1/133607; G02F 1/133611; G02F 1/133614; F21V 5/045; H01L 33/56
See application file for complete search history.

(56) References Cited

U.S. PATENT DOCUMENTS

2021/0397049 A1* 12/2021 Allen ................ G02F 1/133524

FOREIGN PATENT DOCUMENTS

| CN | 110061116 A |   | 7/2019 |
|----|-------------|---|--------|
| CN | 110308587 A |   | 10/2019 |
| CN | 110703497 A | * | 1/2020 |
| CN | 110703497 A |   | 1/2020 |

* cited by examiner

*Primary Examiner* — Britt D Hanley

(57) ABSTRACT

The disclosure provides a mura-compensable direct-lit Mini-LED backlight module, including a PCB substrate, a reflective cover, and an optical diaphragm group which are sequentially arranged from bottom to top. The optical diaphragm group includes at least one diffusion diaphragm, and a plurality of microlens structures are arranged on a light emission side and/or a light incidence side of the diffusion diaphragm to form a microlens structure surface. In the backlight module provided by the disclosure, light is subjected to multiple reflections between the reflective cover and the diffusion diaphragm, thus improving the light emitting uniformity along the diffusion diaphragm.

17 Claims, 10 Drawing Sheets

MURA-COMPENSABLE DIRECT-LIT MINI-LED BACKLIGHT MODULE

CROSS REFERENCE TO RELATED APPLICATIONS

The present application claims the benefit of Chinese Patent Application Nos. 202110098919.9 and 202110098922.0 filed on Jan. 25, 2021. All the above are hereby incorporated by reference in their entirety.

FIELD

The present disclosure belongs to the fields of semiconductor devices and optical systems, and particularly relates to a mura-compensable direct-lit Mini-LED backlight module.

BACKGROUND

A liquid crystal panel of a liquid crystal display device does not emit light. Therefore, a backlight device is arranged on a back side of the liquid crystal panel of the liquid crystal display device as an area light source device, and serves as a light source for illuminating the liquid crystal panel. Mini-LEDs, which can be used as an area light source to emit backlight, have attracted much attention due to high luminance, high resolution, long service life, etc. Mini-LED chips, which are under 200 microns in size, are comparable to OLED products in the display effect and have a competitive advantage compared with OLED in terms of material cost, thus being proposed for use. With the wide application of Mini-LED products, there are more and more Mini-LED based product designs, such as high-luminance backlight and local dimming (HDR) type backlight. The main components of a direct-lit Mini-LED backlight device include an optical diaphragm group, a Mini-LED light source, a reflector plate and the like. With this constituted structure, how to effectively meet the requirement of light emission uniformity without increasing the cost and light luminance is an important issue.

Meanwhile, in order to improve the color reproducibility of Mini-LED display, an effective solution is to narrow a half-value width of each of blue, green and red luminescence spectra of a backlight unit and improve the purity of each of blue, green and red colors. As a measure to solve this issue, Chinese patent CN110308587A proposes a technology of using quantum dots formed by inorganic semiconductor particles as components of color conversion films. The technology using the quantum dots can indeed narrow the half-value widths of the green and red luminescence spectra, improve the color reproducibility and enlarge the color gamut. By combining a quantum dot film having this color conversion function with a blue light source, three primary colors, blue, green and red, can be extracted from the blue light source, that is, white light can be acquired. A full-color display can be manufactured by taking a white light source obtained by combining the blue light source and the quantum dot film having the color conversion function as a backlight unit and combining the backlight unit with a liquid crystal driving part and a color filter. In addition, when there is no liquid crystal driving part, it can be directly used as the white light source, for example, it can be used as a white light source such as an LED illuminant. However, on the other hand, the fluorescence emission of quantum dots is random and has no orientation, so a certain proportion of green and red light is emitted back to an LED backlight source, resulting in huge loss of display luminance.

As shown in FIG. 1, Chinese patent CN110061116A discloses a direct-lit backlight module, which adopts an array LED area light source. The direct-lit backlight module comprises an LED substrate 100, a Mini-LED light source 101, a quantum dot film 303, a diffusion sheet 304 and a luminance enhancement diaphragm 400. Mini-LED light basically follows Lambert distribution, in which the central luminance is higher than the surrounding luminance, so uneven luminance tends to occur in a lighting process of the direct-lit backlight module. At present, diffusion sheets are generally used for light blending or scattering haze particles are added to fluorescent films for light blending, but the addition of film layers will reduce the penetration rate of the whole area light source to affect the overall luminance of the area light source, so that the haze particles or diffusion structures in the fluorescent films cannot achieve a good light blending effect. Chinese patent CN110703497A discloses a backlight device with a reflective cover. The backlight device comprises a plurality of LED light sources, and the reflective cover comprises a reflector cup structure for containing the LED light sources and a quantum dot film above the reflector cup structure. A bottom of the reflector cup structure is provided with an opening, and the LED light sources are arranged in the opening. The arrangement of the reflector cup structure increases the output rate of light in the backlight device and improves the light utilization efficiency. However, light can hardly penetrate a connecting position of the reflector cup structure, thus forming mura, which affects the display effect.

SUMMARY

The purpose of the present disclosure is to provide a mura-compensable direct-lit Mini-LED backlight module, so as to eliminate mura in a backlight module to realize uniform light emission of a Mini-LED backlight module.

According to one aspect of the present disclosure, a mura-compensable direct-lit Mini-LED backlight module is provided, which comprises a PCB substrate with a plurality of Mini-LED light sources mounted on a surface, a reflective cover with a plurality of reflector cup structures with upper and lower openings, and an optical diaphragm group. The PCB substrate, the reflective cover and the optical diaphragm group are sequentially arranged from bottom to top, and the Mini-LED light sources are arranged corresponding to the reflector cup structures on the reflective cover and penetrate through the lower openings of the reflector cup structures. The optical diaphragm group comprises at least one diffusion diaphragm. A plurality of microlens structures are arranged on a light emission side and/or a light incidence side of the diffusion diaphragm to form a microlens structure surface. In diaphragms constituting the optical diaphragm group, a side surface, facing the PCB substrate, of each diaphragm is taken as a light incidence side of the diaphragm, and a side surface, facing away from the PCB substrate, of each diaphragm is taken as a light emission side of the diaphragm.

A pitch P between the Mini-LED light sources is associated with a backlight optical distance (OD) value. Generally, in order to ensure good optical quality, when a designed value of the pitch P between the light sources is fixed, as the backlight OD becomes longer, a transverse propagation distance is farther along a light emission surface, and thus a diffusion range of emitted light becomes larger, which is physically demonstrated by a larger diffusion area. The light emission ranges of the Mini-LED light sources cover each other, so that the spatial distribution of radiation intensity is uniform to ensure uniform luminance transition between the Mini-LED light sources.

In the mura-compensable direct-lit Mini-LED backlight module provided by the present disclosure, the microlens structures arranged on the diffusion diaphragm allow incident light emitted from the Mini-LED light sources to be partially reflected back to the reflective cover, and part of the light is reflected back to the diffusion diaphragm again through the reflective cover, thereby realizing multiple reflections of light between the reflective cover, the diffusion diaphragm and a transflective diaphragm, greatly increasing the propagation OD of light, and further increasing the light emitting uniformity along a plane where the diffusion diaphragm is located. Meanwhile, the reflective cover acts as a condenser lens by re-emitting large-angle incident light emitted by the Mini-LED light sources and reflected light of the microlens structures, which improves the luminance of the direct-lit Mini-LED backlight module. A microlens structure layer is arranged on a side surface of the diffusion diaphragm, and can adjust the visible light transmittance of the diffusion diaphragm.

Preferably, the microlens structures are recessed toward the inside of the diffusion diaphragm to form recessed cavities on a surface of the diffusion diaphragm. The cavities formed by the recessed microlens structures are filled with an air medium, so that the surface of the diffusion diaphragm is provided with an interface of matrixes with different transmittances. A refractive index of air is smaller than refractive indices of most known materials. According to Snell's Law, when light contacts or is incident to a medium with a small refractive index, if an incident angle of light of the Mini-LED light sources is smaller than a critical angle, light is refracted from a normal at an emergent angle $\theta$, which is larger than the incident angle $\delta$, and is formed with respect to the normal, and therefore, a luminance angle of the Mini-LED light sources can be improved, which is beneficial to the transverse diffusion of light; and if the incident angle of light of the Mini-LED light sources is larger than the critical angle, light is reflected back to the reflective cover or other microlens structures without being emitted from the microlens structures, thus increasing the reflection frequency of light between the reflective cover and the diffusion diaphragm and further improving the light emitting uniformity of the plane where the diffusion diaphragm is located.

Preferably, the optical diaphragm group further comprises at least one transflective diaphragm, the reflectivity corresponding to light incident from a light incidence side of the transflective diaphragm at incident angles of 10°, 30° and 50° is R10, R30 and R50 respectively, and the transflective diaphragm satisfies R10>R30>R50. On the basis that the transflective diaphragm satisfies R10>R30>R50, Light emitted by the Mini-LED light sources is more likely to be reflected when incident to the transflective diaphragm at a small angle (0° in a normal direction), while light is more likely to be transmitted when incident to the transflective diaphragm at a large angle, and then the radiation intensity of light emitted at a certain angle near the normal direction of a surface of a Mini-LED chip (e.g., $\theta<30°$) is reduced, and meanwhile, the radiation intensity of light emitted at a certain angle away from the normal direction of the surface of the Mini-LED chip (e.g., $30°<\theta<60°$) is increased, thus finally achieving the effects of eliminating mura and improving the light emitting uniformity.

Preferably, the transflective diaphragm includes the transmissive layer, the resin layers and the reflective layer sequentially arranged, wherein the resin layers are formed by laminating more than 11 thermoplastic resin layers. The refractive index difference between the adjacent thermoplastic resin layers is 0.01 or above in a thickness direction of the transflective diaphragm. Interference reflection is formed by alternately laminating the thermoplastic resin layers with different optical properties. Optionally, different thermoplastic resin layers are regularly laminated to form the transflective diaphragm.

Preferably, the resin layers include resin layers A and resins layer B, and the resin layers A and the resin layers B are alternately compounded to form the transflective diaphragm. For example, the transflective diaphragm is formed by laminating the thermoplastic resin layers according to the rule of A (BA) n (n is a natural number).

Preferably, a side surface, facing the transflective diaphragm, of the diffusion diaphragm is provided with microlens structures. When the assembly of the transflective diaphragm and the diffusion diaphragm meets the above structural relationship, the light emitting uniformity of the backlight module can be improved.

Preferably, the transflective diaphragm is attached to a microlens structure surface of the diffusion diaphragm to realize the composition of the transflective diaphragm and the diffusion diaphragm. Therefore, mura formed by the vertical emission of light along the microlens structures can be eliminated.

Preferably, the microlens structures are arranged on the light emission side of the diffusion diaphragm to form the microlens structure surface on the light emission side of the diffusion diaphragm. If a light emitting element (such as a quantum dot film) is arranged on the light emission side of the diffusion diaphragm, light from the light emitting element can be reflected when incident to the diffusion diaphragm from the light emission side of the diffusion diaphragm, thereby reducing the loss of fluorescence of the light emitting element and increasing the luminance of the backlight module, and at the same time avoiding the imbalance of an RGB ratio of an area light source caused by the partial absorption of the fluorescence of the light emitting element by the PCB substrate.

Preferably, the optical diaphragm group is attached to a top of the reflective cover, so that the optical diaphragm group seals the upper openings of the reflector cup structures. Therefore, on the one hand, light diffusion on the optical diaphragm group is increased, and light incident to a composite diaphragm at a large angle (0° in the normal direction) is subjected to multiple refractions and reflections to increase the transverse diffusion of light along a direction P, thus effectively improving the luminance angle of the Mini-LED light sources; on the other hand, the light incident to the optical diaphragm group at a small angle is more likely to be reflected, so that a light field with uniform light intensity distribution is formed above the direct-lit Mini-LED backlight module, mura is eliminated, and the problems of luminance and darkness difference of backlight, dark corners of pictures and dark parts of light are improved. On the other hand, the reflective cover directly supports the optical diaphragm group, which improves the structural stability of the direct-lit Mini-LED backlight module. Meanwhile, several optical cavities are formed by enclosing of the reflective cover and the optical diaphragm group, which can increase the utilization rate of light energy. To sum up, in the above-mentioned assembly structure, the optical elements can better cooperate with each another, which is beneficial to uniform light distribution and better light convergence effect, thereby avoiding mura and further increasing the luminance of light at an observation angle.

Preferably, in the optical diaphragm group, the diffusion diaphragm is used as a bottom diaphragm. A distance H between a light incident side surface of the bottom diaphragm and an upper surface of the PCB substrate is equal to a thickness T of the reflective cover. In the above structure, the reflective cover, the diffusion diaphragm and the transflective diaphragm are sequentially attached from bottom to top.

Preferably, the transflective diaphragm satisfies that the average reflectivity for blue light is greater than 40%, or the average reflectivity for red light and green light is greater than 70%.

Preferably, the optical diaphragm group further comprises a diffusion sheet and a quantum dot film, the Mini-LED light sources are blue light sources, the transflective diaphragm comprises a first transflective diaphragm and a second transflective diaphragm, and the diffusion diaphragm, the first transflective diaphragm, the diffusion sheet, the second transflective diaphragm and the quantum dot film are sequentially laminated from bottom to top; and the average reflectivity of the first transflective diaphragm for blue light is greater than 40%, and the average reflectivity of the second transflective diaphragm for red light and green light is greater than 70%.

When a fluorescent light source of the quantum dot film is incident from a light emission side of the composite diaphragm composed of the diffusion diaphragm and the transflective diaphragm, and when the incident angle is larger than the critical angle, the microlens structures of the diffusion diaphragm or the transflective diaphragm reflect part of light. Light from the quantum dot film is reflected by the composite diaphragm, so that the fluorescence loss of the quantum dot film can be reduced to increase the luminance of the backlight module. Specifically, the composite diaphragm can reflect red and green light from the quantum dot film, thus avoiding yellowish light caused by imbalance of the RGB ratio of the area light source resulting from the partial absorption of red and green light RG by the PCB substrate.

Optionally, the bottom diaphragm of the optical diaphragm group is the semi-transparent diffusion diaphragm, and the reflective cover, the transflective diaphragm and the diffusion diaphragm are sequentially attached from bottom to top so that the transflective diaphragm can seal the upper openings of the reflector cup structures.

Preferably, the distance between a lower surface of the optical diaphragm group and the Mini-LED light sources is H, and a minimum pitch between the adjacent Mini-LED light sources is P, H:P=1:1-1:7. Therefore, the luminance angle of the Mini-LED light sources is at least increased to 2 arctan (P/2H), and the luminance and uniformity of the direct-lit Mini-LED backlight module are improved.

Preferably, the microlens structures are subjected to periodic distribution corresponding to the reflector cup structure, and the periodic distribution means that a plurality of microlens structures located right above the upper opening of each reflector cup structure form a microlens structure group which is used as a repeating unit for the periodic distribution.

Preferably, each microlens structure group corresponds to the Mini-LED light source arranged in its corresponding reflector cup structure; and in the microlens structure group, with an optical axis of its corresponding Mini-LED light source as a central axis, the distribution density of the microlens structures decreases in a radiation manner.

Preferably, each microlens structure group corresponds to the Mini-LED light source arranged in its corresponding reflector cup structure; and in the microlens structure group, with the optical axis of its corresponding Mini-LED light source as the central axis, the slope of a concave inclined surface of each microlens structure increases as the pitch between each microlens structure and the central axis decreases. Based on the above structure, light transmitted by optical diaphragms follows the rule that light transmitted along a direction collinear with a long side of each microlens structure has a large diffusion angle, and light transmitted along a direction collinear with a short side of each microlens structure has a small diffusion angle.

Preferably, both the light incidence side and the light emission side of the diffusion diaphragm are provided with the microlens structures.

Preferably, each microlens structure group corresponds to the Mini-LED light source arranged in its corresponding reflector cup structure; and in the microlens structure group, with the optical axis of its corresponding Mini-LED light source as the central axis, the size of each microlens structure increases with the decrease of the pitch between each microlens structure and the central axis, so that a thin film structure whose edges are thicker than the middle is formed in a region of the diffusion diaphragm where the microlens structure group is located. The film structure formed thereby is equivalent to a microlens structure like a double concave lens, which has a light convergence function to make the uniformly diffused area light source focus on a viewing direction, thus improving the luminance.

Preferably, the PCB substrate and the reflective cover are bonded and fixed by an optical adhesive layer, the lower opening of each reflector cup structure is attached to the optical adhesive layer, and the optical adhesive layer is attached to a surface of the PCB substrate and covers the Mini-LED light sources to form a Fresnel lens above the Mini-LED light sources. The Fresnel lens formed by utilizing the optical adhesive layer can reflect and redirect light near the optical axis of the Mini-LED light sources in a higher ratio.

DETAILED DESCRIPTION OF ILLUSTRATED EMBODIMENTS

Figure 1:
FIG. 1 is a structural diagram of a backlight module in the prior art.

The following description is based on the illustrated specific embodiments of the present disclosure, which should not be regarded as limiting other specific embodiments of the present disclosure, which are not detailed herein.

As used in the specification, the word "embodiment" refers to serving as an instance, example or illustration. Furthermore, the article "a" and "an" as used in this specification and the appended claims can generally be interpreted as "one or more" unless otherwise specified or clearly directed to the singular form from the context.

In the description of the present disclosure, it should be understood that the orientation or positional relationship indicated by the terms like "center", "longitudinal", "transverse", "length", "width", "thickness", "upper", "lower", "front", "rear", "left", "right", "vertical", "horizontal", "top", "bottom", "inner", "outer", "clockwise" and "anticlockwise" is based on the orientation or positional relationship shown in the drawings, and only for the convenience of describing the present disclosure and simplifying the description, and does not indicate or imply that the referred device or element needs to have a specific orientation, be constructed and operated in a specific orientation, so that it cannot be understood as limiting the present disclosure.

In the description of the present disclosure, it should be noted that unless otherwise specified and defined, the terms "arrange", "link" and "connect" should be understood in a broad sense, for example, it can be fixed connection, detachable connection or integrated connection; it can be mechanical connection, electrical connection or communication; it can be direct connection or indirect connection through an intermediate medium; and it can be internal communication of two elements or interaction between two elements. Those of ordinary skill in the art can understand the specific meanings of the above terms in the present disclosure according to specific situations.

In addition, unless otherwise explicitly specified and defined, a first feature being "above" or "below" a second feature may include direct contact between the first and second features, or may also include that the first and second features are not in direct contact but are in contact via another feature between them. Further, the first feature being "on", "above" and "over" the second feature includes that the first feature is right above and obliquely above the second feature, or indicates that the first feature is higher in horizontal height than the second feature. The first feature being "below", "under" and "underneath" the second feature includes that the first feature is right below and obliquely below the second feature, or indicates that the first feature is lower in horizontal height than the second feature.

The following provides many different embodiments or examples for implementing different structures of the present disclosure. In order to simplify the disclosure of the present disclosure, components and arrangements of specific examples are described hereinafter. Of course, they are only examples and are not intended to limit the present disclosure. In addition, reference numerals and/or reference letters can be repeatedly used in different examples of the present disclosure, and such repetition is for the sake of simplicity and clarity, and does not indicate the relationship between the various embodiments and/or arrangements discussed. In addition, the present disclosure provides examples of various specific processes and materials, but those of ordinary skill in the art can realize the application of other processes and/or the use of other materials.

Figure 2:
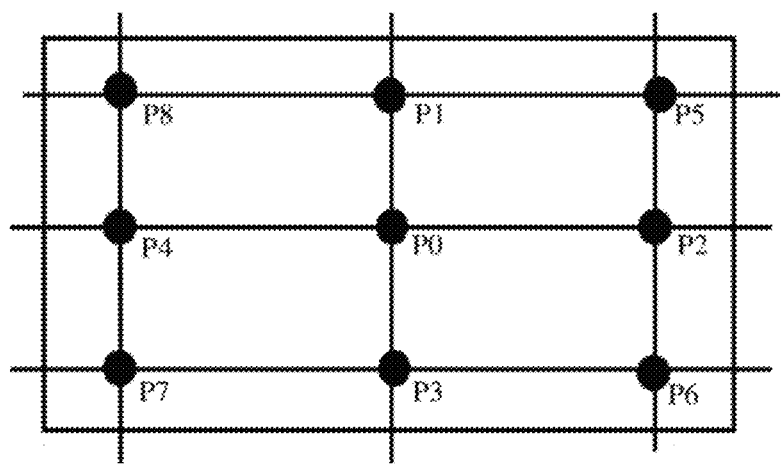
FIG. 2 is a diagram of a nine-point test method.

A method for testing luminance and luminance uniformity involved in the following embodiments is implemented by referring to the general industrial standard in the art. With reference to FIG. 2, the luminance of different positions on a surface of a tested product is tested by using a nine-point measurement method, and the luminance uniformity of the tested product is represented by a minimum value of the ratios of luminance values of eight test points P1-P8 to a central test point P0. According to the general industrial standard in the art, the front luminance of a center point of a light emission surface of a high-performance backlight module should not be less than 350 nit, and the luminance uniformity is not lower than 75%.

The distribution test of luminance angles involved in the following embodiments is implemented by referring to the general industrial standard in the art.

(a) a luminance meter is placed at the position of a three-times Mini-LED light source 101 (a single Mini-LED light source 101 or chip in the Mini-LED backlight module is lighted up, or a region of the single Mini-LED light source 101 in the Mini-LED backlight module is cut off) or at the position of a three-times Mini-LED backlight module; and (b) the luminance meter may be able to move horizontally and vertically, an observation distance is kept unchanged, an included angle between the luminance meter and an illumination normal of the Mini-LED light source 101 or the Mini-LED backlight module changes from −90° to 90°, and luminance data of each test position is recorded; and a luminance angle of the Mini-LED light source 101 or the Mini-LED backlight module is an included angle in the case of one third of a luminance peak value.

Embodiment 1

Figure 3:
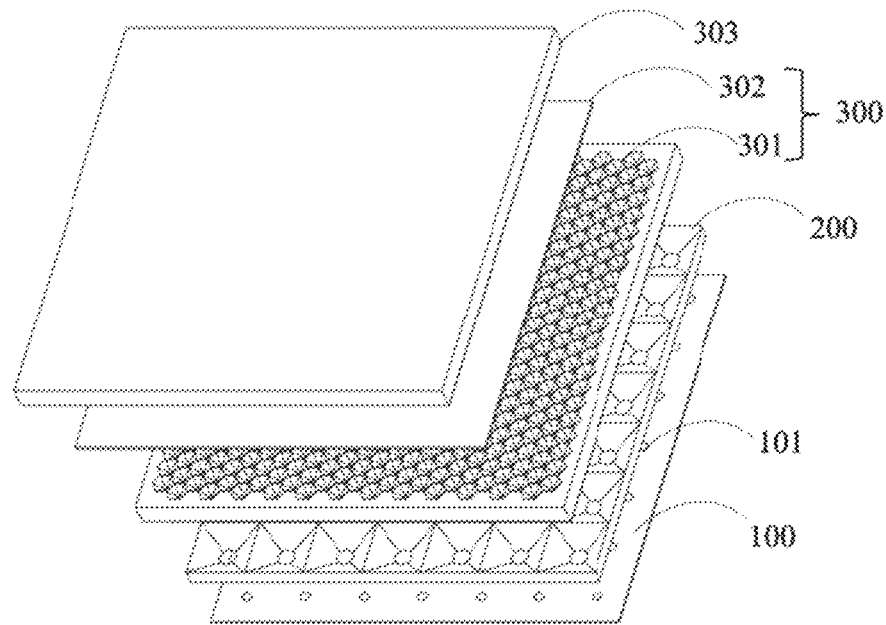
FIG. 3 is an exploded view of a direct-lit Mini-LED backlight module according to Embodiment 1 of the present disclosure.
Figure 4:
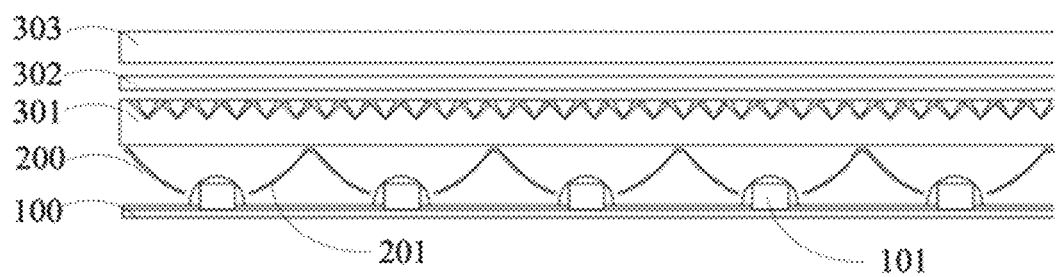
FIG. 4 is a partial sectional view of the direct-lit Mini-LED backlight module according to Embodiment 1 of the present disclosure.

This embodiment provides a direct-lit Mini-LED backlight module, as shown in FIGS. 3-4, which comprises a PCB substrate 100, a reflective cover 200, a diffusion diaphragm 301, a transflective diaphragm 302 and a quantum dot film 303 arranged from bottom to top.

Figure 6:
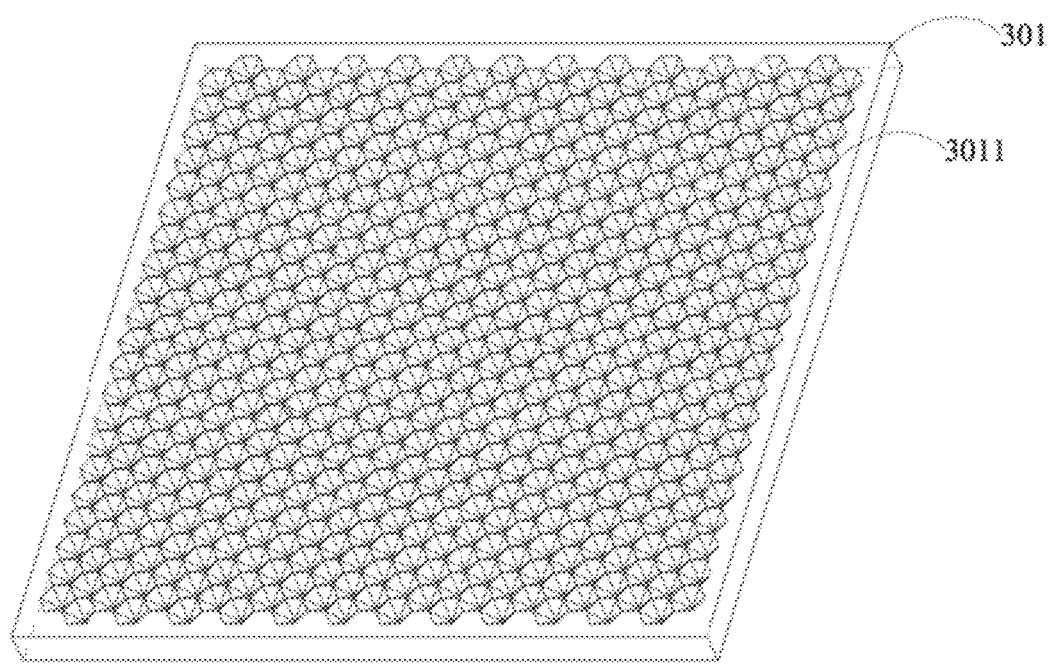
FIG. 6 is a stereoscopic view of a diffusion diaphragm of Embodiment 1 of the present disclosure.
Figure 7:
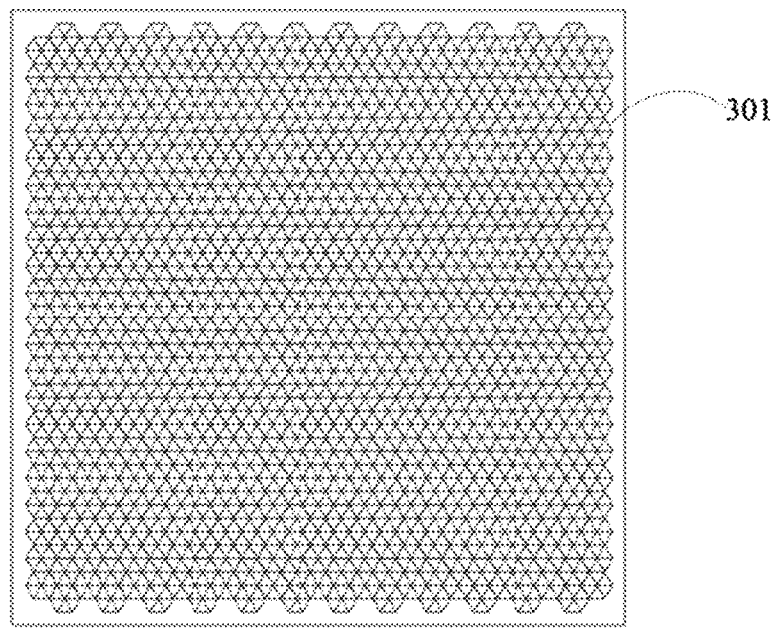
FIG. 7 is a top view of the diffusion diaphragm of Embodiment 1 of the present disclosure.

In the direct-lit Mini-LED backlight module provided in this embodiment, the diffusion diaphragm 301 adopted is made from polycarbonate (PC) with a material transmittance of 95%. As shown in FIG. 6, two sides surfaces, perpendicular to a thickness direction, of the diffusion diaphragm 301 are taken as a light emission side and a light incidence side of the diffusion diaphragm 301, and a plurality of microlens structures 3011 periodically arranged according to a certain distribution rule are arranged on the light emission side of the diffusion diaphragm 301 to form a microlens structure 3011 surface. The light incidence side of the diffusion diaphragm 301 is not provided with microlens structures 3011. Due to the arrangement of the microlens structure 3011 surface, a transmittance of visible light reaches 64% at the light incidence side and 91% at the light emission side of the diffusion diaphragm adopted in this embodiment. As shown in FIGS. 6-7, the microlens structures 3011 on the diffusion diaphragm 301 adopted in this embodiment are hexagonal pyramid structures recessed into the diffusion diaphragm 301, and each recessed microlens structure 3011 is adjacent to at least one of other microlens structures 3011. In other embodiments, the microlens structures 3011 may be polygonal pyramid structures, hemispherical structures, tetrahedron structures, polyhedron structures, cylinder structures or near-cone structures recessed toward the inside of the diffusion diaphragm 301. In this embodiment, a ratio of heights of the plurality of microlens structures 3011 to a thickness of the diffusion diaphragm 301 is 1:3. If a microlens structure 3011 layer is too thin (the ratio of the heights of the microlens structures 3011 to the thickness of the diffusion diaphragm is less than 1:6), local light convergence tends to occur, which further aggravates mura caused by local dimming. If the ratio of the heights of the microlens structures 3011 to the thickness of the diffusion diaphragm is more than 5:6, an overall thickness of the backlight module may be too large. In this embodiment, the transflective diaphragm 302 adopted is formed by alternately laminating and compounding 100 thermoplastic resin layers with different optical properties, and the adopted thermoplastic resins satisfy that a refractive index difference between the adjacent thermoplastic resin layers is 0.01 or above in a thickness direction of the transflective diaphragm 302. In this embodiment, the thermoplastic resin layers are formed by a thermoplastic resin A and a thermoplastic resin B, and the included thermoplastic resin layers are expressed as layers A and layers B according to material types. The thermoplastic resin layers are laminated in a regular arrangement of A(BA)n (n is a natural number) along the thickness direction to form the transflective diaphragm 302. By alternately laminating resins with different optical properties, the interference reflection performance of light can be designed according to the relationship between the refractive index difference between different layers and layer thickness. The reflectivity corresponding to light incident to the transflective diaphragm 302 at 10°, 30° and 50° is R10, R30 and R50 respectively, and the transflective diaphragm 302 of this embodiment satisfies R10>R30>R50.

As shown in FIG. 4, a plurality of Mini-LED light sources 101 are mounted on a surface of the PCB substrate 100, and the plurality of Mini-LED light sources 101 are subjected to periodic arrangement on the surface of the PCB substrate 100. The "periodic arrangement" of the Mini-LED light sources 101 refers to matrix arrangement. The reflective cover 200 comprises a plurality of reflector cup structures 201 with upper and lower openings. The PCB substrate 100, the reflective cover 200, the diffusion diaphragm 301, the transflective diaphragm 302 and the quantum dot film 303 are sequentially attached from bottom to top. Each Mini-LED light source 101 is arranged corresponding to one reflector cup structure 201, and the Mini-LED light source 101 penetrates through the lower opening of the corresponding reflector cup structure 201 to be arranged in the reflector cup structure 201. The light incidence side of the diffusion diaphragm 301 is attached to a top of the reflective cover 200. A thickness T of the reflective cover 200 is equal to a distance H between the light incidence side of the diffusion diaphragm 301 and an upper surface of the PCB substrate 100. The reflective cover 200 directly supports the diffusion diaphragm 301, which improves the stability of the direct-lit Mini-LED backlight module. Meanwhile, the diffusion diaphragm 301 seals the upper openings of the reflector cup structures 201, thus forming optical cavities enclosed by the diffusion diaphragm 301 and the reflector cup structures 201 of the reflective cover 200, and improving the utilization rate of light energy. The microlens structure 3011 surface formed on the light incidence side of the diffusion diaphragm 301 is attached to the transflective diaphragm 302, and a diaphragm group formed by composition of the diffusion diaphragm 301 and the transflective diaphragm 302 is marked as a composite diaphragm 300. On a composite surface of the diffusion diaphragm 301 and the transflective diaphragm 302, closed cavities are formed between the microlens structures 3011 on the light emission side of the diffusion diaphragm 301 and the transflective diaphragm 302, and a medium in the cavities is air. The microlens structures 3011 on the diffusion diaphragm 301 are arranged corresponding to the Mini-LED light sources 101 on the PCB substrate 100 and the reflector cup structures 201 of the reflective cover 200. Each Mini-LED light source 101 corresponds to a plurality of microlens structures 3011, and based on the periodic arrangement of the Mini-LED light sources, the corresponding microlens structures 3011 are also in periodic arrangement. The plurality of microlens structures 3011 corresponding to each Mini-LED light source 101 are located right above the upper opening of the reflector cup structure 201 where the Mini-LED light source 101 is located, and a diameter ratio of the microlens structures 3011 to the upper opening of the reflector cup structure 201 is less than 1/10.

With reference to FIGS. 5-11, the direct-lit Mini-LED backlight module of this embodiment will be described below.

Figure 5:
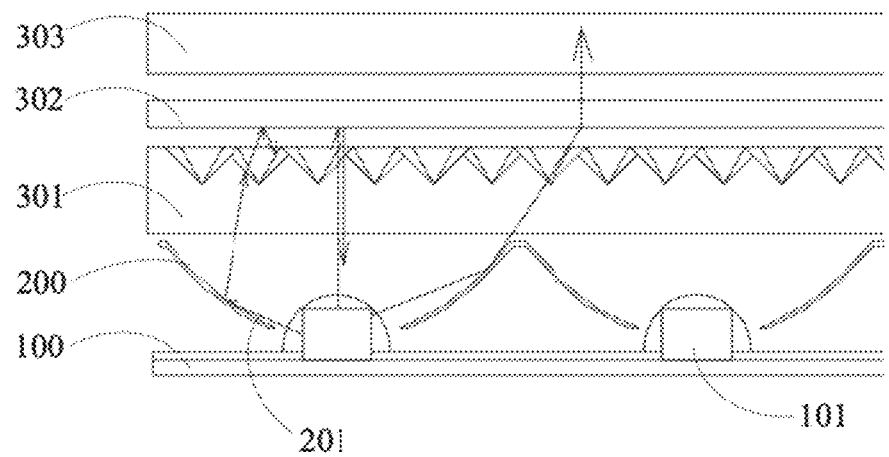
FIG. 5 is a sectional view of the direct-lit Mini-LED backlight module according to Embodiment 1 of the present disclosure and its optical principle.

In this embodiment, the composite diaphragm 300 and the reflective cover 200 which are attached in a vertical direction are arranged on the PCB substrate 100. As shown in FIG. 5, the transflective diaphragm 302 and the plurality of microlens structures 3011 on the light emission side of the diffusion diaphragm 301 reflect part of incident light back to the reflective cover 200, and simultaneously, the reflective cover 200 re-emits large-angle incident light emitted by the Mini-LED light sources 101 and reflected light of the microlens structures 3011, and acts as a condenser lens to play the role of improving the luminance of the direct-lit Mini-LED backlight module, wherein part of light is reflected to the diffusion diaphragm 301 again through the reflective cover 200. Therefore, light is subjected to multiple reflections between the reflective cover 200, the diffusion diaphragm 301 and the transflective diaphragm 302, which greatly increases the propagation OD of light, thus improving the light emitting uniformity along a plane where the diffusion diaphragm 301 is located. In the direct-lit Mini-LED backlight module provided in this embodiment, the reflective cover 200, the transflective diaphragm 302 and the diffusion diaphragm 301 provided with the plurality of microlens structures 3011, which are attached in order from bottom to top, cooperate with each another to realize uniform light distribution, eliminate mura and improve the luminance of light at the observation angle.

As described above, in the composite membrane 300, the closed cavities are formed between the microlens structures 3011 on the light emission side of the diffusion diaphragm 301 and the transflective diaphragm 302, and the medium in the cavities is air. Those skilled in the art can understand that a refractive index of air is smaller than refractive indexes of most known materials. When incident light passes through materials with different refractive indices, Snell's Law is satisfied, i.e., $ni*Sin\delta = nt*Sin\theta$, where ni represents a refractive index of an incident light side material, $\delta$ represents an incident angle, nt represents a refractive index of a transmitted light side material, and $\theta$ represents an emergent angle. According to the principle of Snell's Law, when light contacts or is incident to a medium with a small refractive index, part of light is refracted from a normal at the emergent angle $\theta$ which is larger than the incident angle $\delta$ and formed with respect to the normal. However, incident light (e.g., light 1a in FIG. 8) incident to a surface (material-air boundary in this embodiment) contacting the medium in the normal direction of the surface is not refracted but continues to propagate in a straight line in its incident direction. Those skilled in the art should understand that a certain amount of incident light can also be reflected back to the reflective cover 200.

Figure 8:
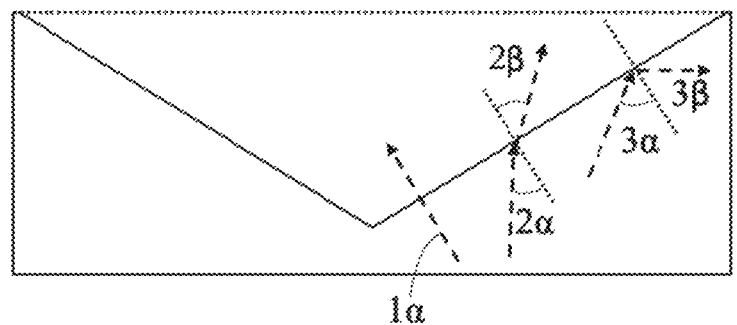
FIG. 8 is an optical schematic diagram of the diffusion diaphragm according to Embodiment 1 of the present disclosure.
Figure 9:
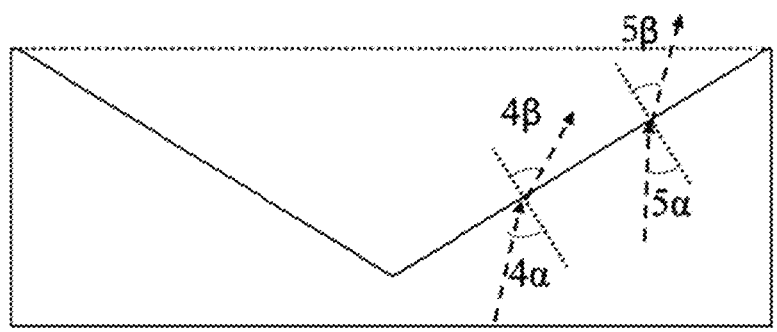
FIG. 9 is an optical schematic diagram of the diffusion diaphragm according to Embodiment 1 of the present disclosure.

FIGS. 8 and 9 show a situation where light is incident to a contact surface of one microlens structure 3011 and an air medium from the inside of the microlens structure 3011. Light in FIG. 8 arrives at the contact surface of the microlens structure 3011 and the air medium at an incident angle of $2\alpha$ formed with respect to the normal of the microlens structure 3011. Since the incident angle $2\alpha$ of light is not equal to zero (0), according to Snell's law, light is refracted into the air medium at an emergent angle $2\beta$ which is different from the incident angle $2\alpha$ in value, and the incident angle $2\alpha$ of light is smaller than its emergent angle $2\beta$ because the refractive index of the air medium is smaller than that of the microlens structure 3011. As shown in FIG. 8, light propagating into the microlens structure 3011 reaches the contact surface of the microlens structure 3011 and the air medium at an incident angle $3\alpha$ formed with respect to the normal of the surface, and the incident angle $3\alpha$ of light is larger than a critical angle Sc at the contact surface. In this case, light is not emitted from the microlens structure 3011 and is reflected back to the reflective cover 200 or other microlens structures 3011, which is called "total internal reflection". As mentioned above, when light propagates from a material with a higher reflection coefficient to a material with a lower reflection coefficient, light is represented according to a Snell's law formula set forth above. According to this formula, with the increase of the incident angle, the emergent angle $\theta$ will approach 90°. However, in the case of presence of the critical angle $\delta c$, and all angles greater than the critical angle $\delta c$, total internal reflection will occur (i.e., light will be reflected instead of being refracted, and propagate through the surface). As will be understood by those skilled in the art, the critical angle Sc is determined according to Snell's law by setting the emergent angle (refraction angle) to 90° and calculating the incident angle. As shown in FIG. 9, light 4a and light 5a contact on the surface at incident angles $4\alpha$ and $5\alpha$ which are smaller than the critical angle Sc, respectively, however, the incident angle $4\alpha$ of light with respect to the normal of the surface is larger than the incident angle $5\alpha$ of light with respect to the normal of the surface. Therefore, according to Snell's law, the emergent angle $4\beta$ of light with respect to the normal of the surface is different from the emergent angle $5\beta$ of light with respect to the normal of the surface. As understood by those skilled in the art, the emergent angle $4\beta$ of light with respect to the normal of the surface will be larger than the emergent angle $5\beta$ of light with respect to the normal of the surface.

Therefore, compared with a microlens structure 3011 surface with a smaller angle, a microlens structure 3011 surface with a larger angle can generally "focus" more light in a direction orthogonal to backlight, that is, increase the propagating OD of light. Therefore, the microlens structures 3011 as described allows light to have a larger diffusion angle in one direction and a smaller diffusion angle in another direction. In some exemplary embodiments, a diffusion angle of light propagating through an exemplary optical film of the present disclosure is large in a direction collinear with a long side of the microlens structure 3011 and small in a direction collinear with a short side of the microlens structure 3011.

Figure 10:
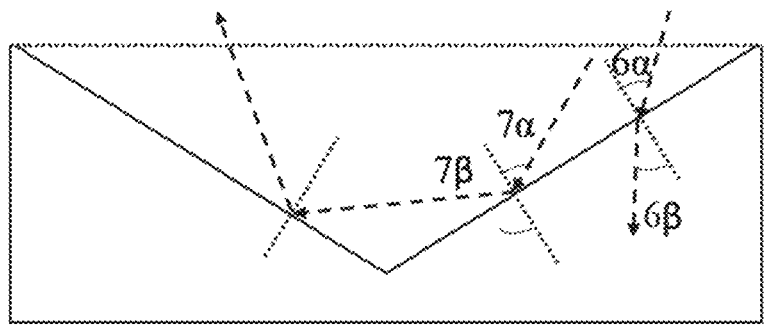
FIG. 10 is an optical schematic diagram of the diffusion diaphragm according to Embodiment 1 of the present disclosure.

FIG. 10 shows a situation where light is incident to the contact surface of one microlens structure 3011 and the air medium from the air medium. As shown in FIG. 10, when a fluorescent light source of the quantum dot film 303 is incident from a light emission side of the composite diaphragm 300, most of light is reflected back to the quantum dot film 303 by the transflective diaphragm 302. When the incident angle of light transmitted through the transflective diaphragm 302 is beyond the critical angle $\delta c$, the diffusion diaphragm 301 reflects part of light. Light 6a and light 7a contact on an outer surface of the microlens structure 3011 at an incident angle $6\alpha$ smaller than the critical angle $\delta c$ and an incident angle $7\alpha$ larger than the critical angle $\delta c$, respectively. Light with the incident angle $6\alpha$ enters the diffusion diaphragm 301 at an emergent angle $6\beta$ with respect to the normal of the surface, and light with the incident angle $7\alpha$ is reflected at an emergent angle $7\beta$ with respect to the normal of the surface and then totally reflected back to the quantum dot film 303. Therefore, light from the quantum dot film 303 is reflected by the transflective diaphragm 302 and the diffusion diaphragm 301, thereby reducing the fluorescence loss of the quantum dot film 303 and improving the luminance. Meanwhile, yellowish light caused by imbalance of an RGB ratio of an area light source resulting from the partial absorption of red and green light RG by the PCB substrate 100 is avoided.

Figure 11:
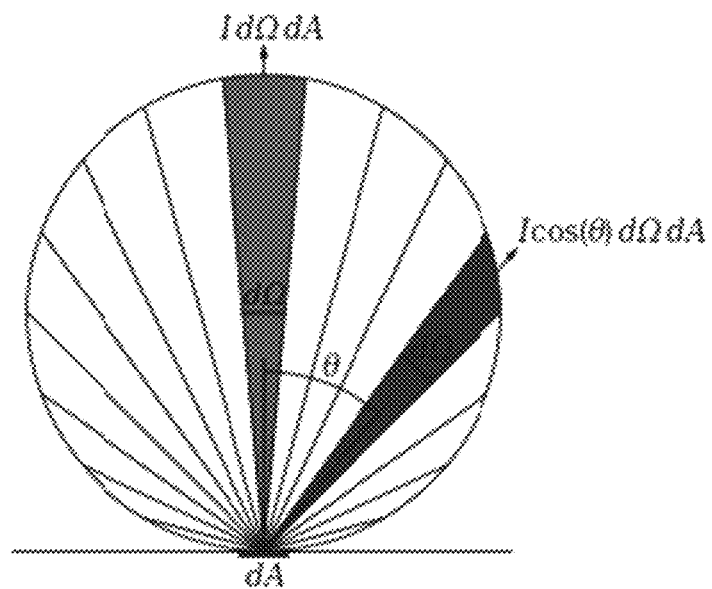
FIG. 11 is a radiation distribution diagram of a Lambert radiator.
Figure 12:
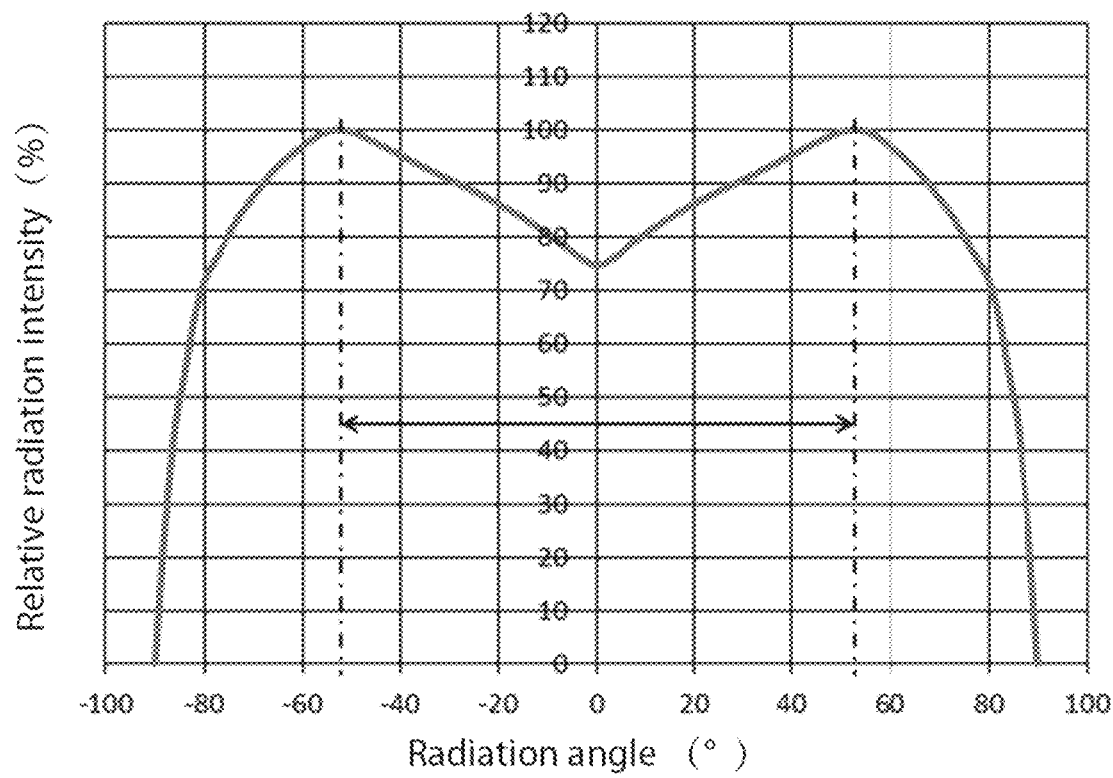
FIG. 12 is a radiation characteristic curve of a Mini-LED light source.
Figure 13:
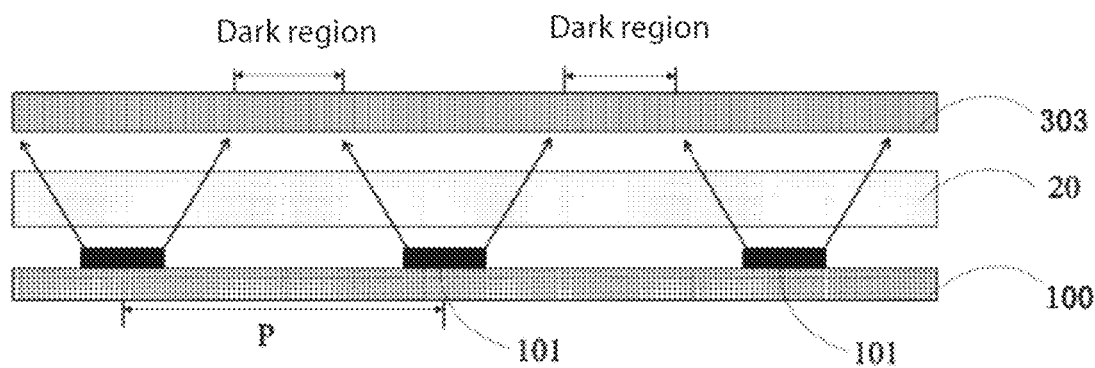
FIG. 13 is an optical schematic diagram of a Mini-LED backlight module without a composite diaphragm and a reflective cover.
Figure 14:
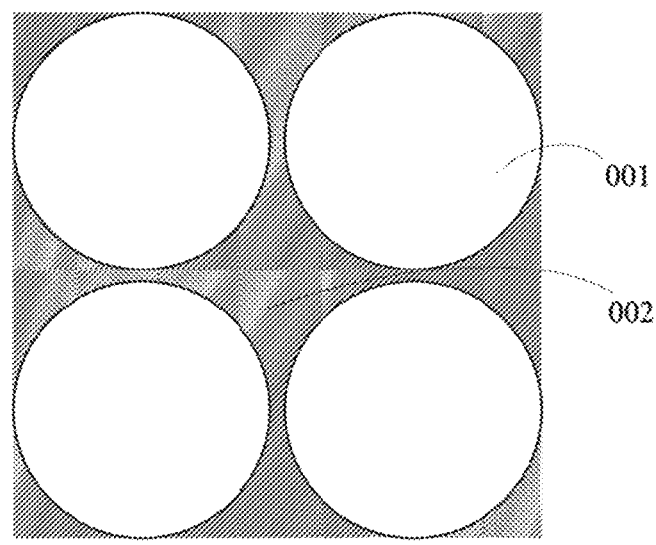
FIG. 14 is a diagram of mura formed on a quantum dot film by a Mini-LED backlight module without a composite diaphragm and a reflective cover.
Figure 16:
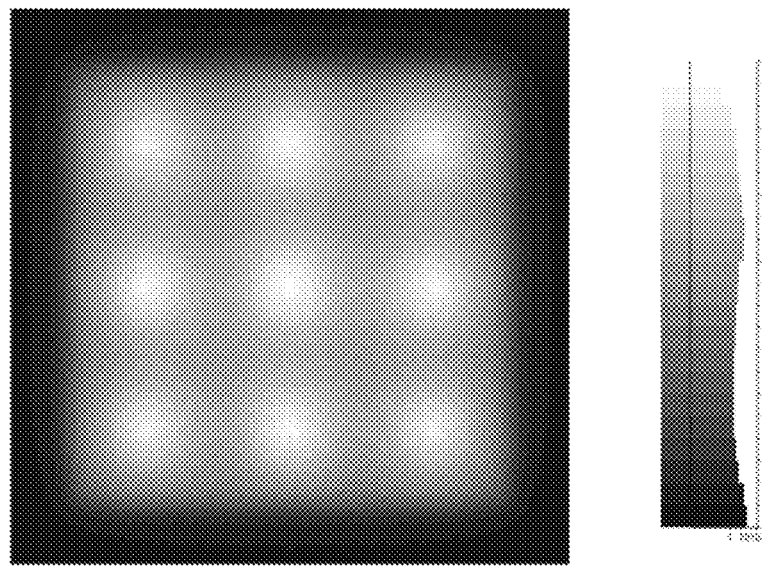
FIG. 16 is an illuminance diagram of a Mini-LED backlight module without a composite diaphragm and a reflective cover in Embodiment 1.

The Mini-LED chip is a light source close to a Lambert radiator. According to Lambert's cosine law, from an ideal diffuse reflection surface, the radiation intensity or luminous intensity I of the light source is proportional to the cosine $\cos\theta$ of the angle $\theta$ between the direction of emitted light and the surface normal. As shown in FIG. 11, each wedge in the circle represents an equal angle dΩ, and for a Lambert surface, the number of photons emitted to each wedge per second is proportional to an area A of the wedge. As shown in FIG. 12, the radiation characteristic curve of the Mini-LED light sources 101 on the PCB substrate 100 is M-shaped. Generally, an included angle A between two peaks of the M-shaped peak defined by emitted light indicates its diffusion degree. The larger the included angle A, the better the diffusion effect. Generally, the included angle A of the M-shaped peak of the Mini-LED light sources 101 is within 120°. However, a Pitch (P) of Mini-LED light sources is usually dozens of times larger than the size of the Mini-LED chip, reaching a centimeter level. However, a thickness of an optical diaphragm 20 of the Mini-LED backlight module is only of a millimeter level, so that in the case of such a short propagation distance, as shown in FIGS. 13, 14 and 16, the Mini-LED light sources 101 on the PCB substrate 100 form mura 001 and a dark region 002 on the quantum dot film 303 on a backlight device without the reflective cover 200 and the diffusion diaphragm 301. Therefore, in order to avoid dark regions of the area light source formed by light emitted by a plurality of Mini-LED chips and meanwhile reduce the usage number of the Mini-LED chips (i.e., increase the pitch P of mini-LED), it is necessary to reduce the radiation intensity of light emitted at a certain angle near the normal direction of the surface of the Mini-LED chips (e.g., θ<30°), and meanwhile increase the radiation intensity of light emitted at a certain angle away from the normal direction of the surface of the Mini-LED chips (e.g., 30°<θ<60°).

As described above, the transflective diaphragm 302 used in this embodiment satisfies R10>R30>R50. Therefore, when light from the Mini-LED light sources 101 is incident to the transflective diaphragm 302 from the light incidence side of the transflective diaphragm 302, light incident to the transflective diaphragm 302 at a small angle (0° with respect to the normal direction) is more likely to be reflected, thus reducing the radiation intensity of light emitted near the normal direction of the surfaces of the Mini-LED chips; and light incident to the transflective diaphragm 302 at a large angle is more likely to be transmitted, thus increasing the radiation intensity of light emitted away from the normal direction of the surfaces of the Mini-LED chips. Finally, the effect of eliminating mura is achieved. In addition, the microlens structure 3011 surface of the diffusion diaphragm 301 is attached to the transflective diaphragm 302, so that mura formed by vertically emitting light along the microlens structures 3011 can be eliminated.

Figure 15:
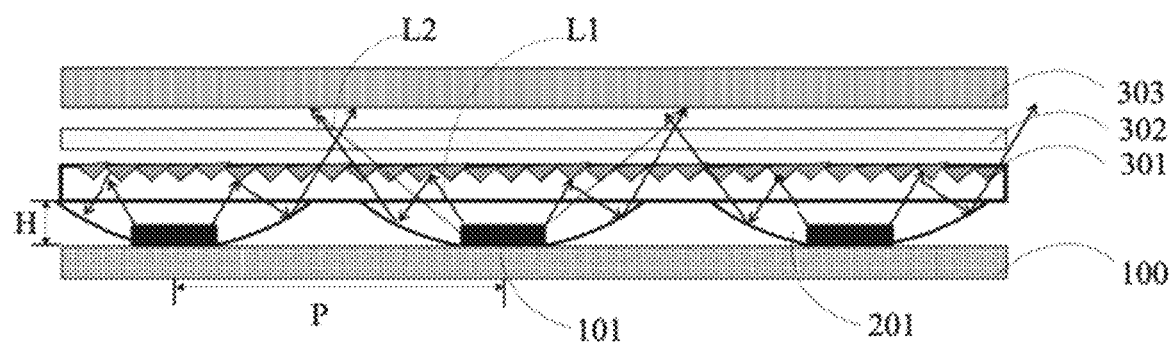
FIG. 15 is a diagram of a direct-lit Mini-LED backlight module with a composite diaphragm and a reflective cover and its optical principle.
Figure 17:
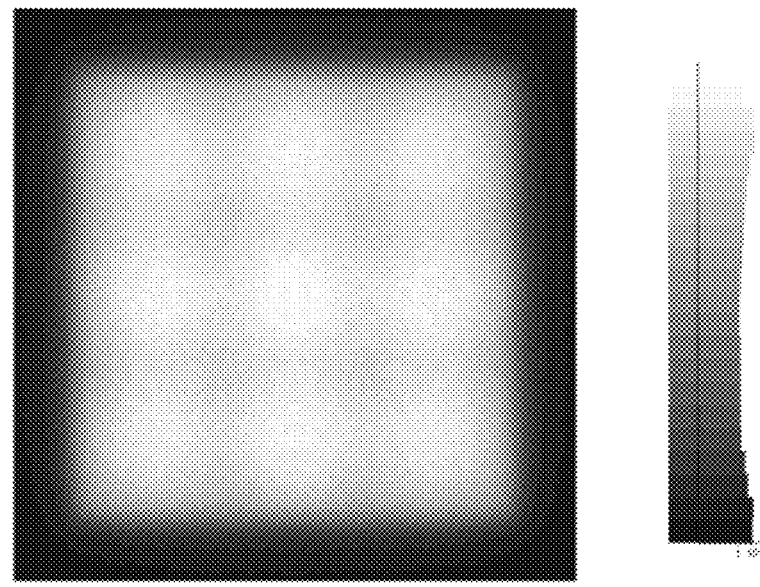
FIG. 17 is an illuminance diagram of a Mini-LED backlight module with a composite diaphragm and a reflective cover in Embodiment 1.

As shown in FIGS. 15 and 17, in the present disclosure, the diffusion diaphragm 301 and the reflective cover 200 which are attached in the vertical direction are arranged on the PCB substrate 100, and incident light is partially reflected back to the reflective cover 200 through the plurality of microlens structures 3011, and is reflected again to the diffusion diaphragm 301 through the reflective cover 200 on the surface of the PCB substrate 100. Light is subjected to multiple reflections between the reflective cover 200 and the diffusion diaphragm 301, which greatly increases the propagation OD of light, thus increasing the propagation along the plane where the diffusion diaphragm 301 is located. A luminance angle of each of the Mini-LED light sources 101 extends from L1 to L2 (dotted line).

The pitch P between the Mini-LED light sources 101 is associated with a value of a vertical optical distance VOD (perpendicular to the Mini-LED area light source) of the backlight module. The larger the P/VOD, the better the backlight design, that is to say, the backlight module can use fewer Mini-LED chips in the case of the same VOD; or in the case of the same pitch P between the Mini-LED light sources 101, VOD can be reduced so that the backlight module can be made thinner. Generally, in order to ensure good optical quality, when the design value of the pitch P of the light sources is fixed, as the horizontal optical distance HOD (parallel to the Mini-LED area light source) of the backlight module becomes longer, the transverse propagation distance is farther along the light emission surface, and thus the diffusion range of the emitted light becomes larger which is physically demonstrated by the larger luminance angle measured. The spatial distribution of radiation intensity is uniform to ensure uniform luminance transition between the Mini-LED light sources 101.

A ratio H/P of the distance H between the light incidence side of the diffusion diaphragm 301 and the PCB substrate 100 to the minimum pitch P between the adjacent Mini-LED light sources 101 is within the range of 1/7-1, the luminance angle of each of the Mini-LED light sources 101 is at least increased to 2 arctan (P/2H), and the light emitting uniformity of the direct-lit Mini-LED backlight module is at least increased by 10%. When H/P is 1/2, the luminance uniformity of the direct-lit Mini-LED backlight module is increased by 15%. When H/P is 1/5, the luminance angle of each of the Mini-LED light sources 101 is increased from 120° to 140°, and the luminance angle of the backlight module is increased to 160°.

The ratio H/PF of the distance H between the light incidence side of the diffusion diaphragm 301 and the PCB substrate 100 to the maximum distance PF between the adjacent Mini-LED light sources 101 is 1/2, and the luminance diffusion angle of the backlight module is increased to 2 arctan (PF/2H) or above.

Embodiment 2

Figure 18:
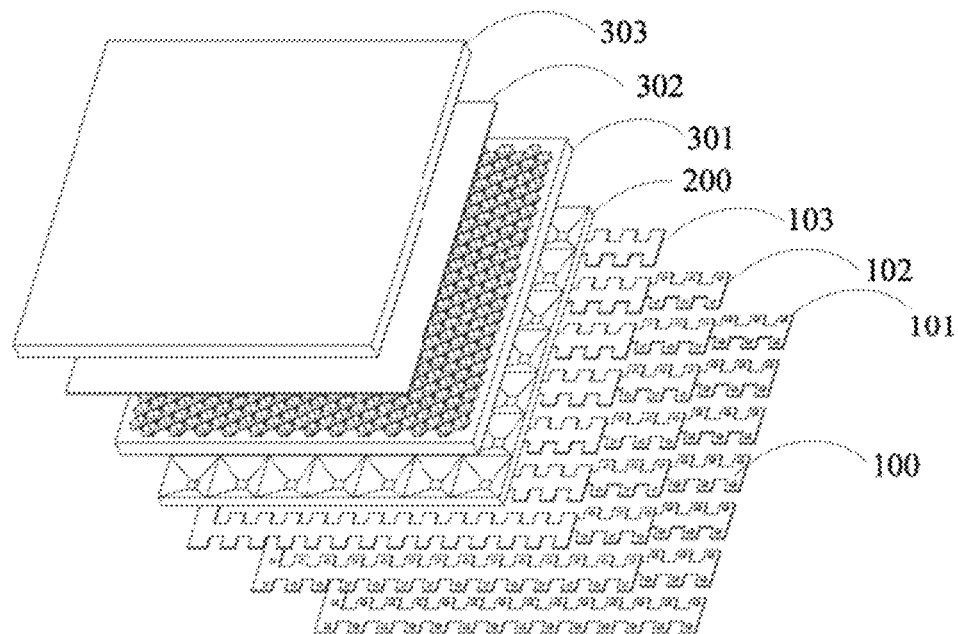
FIG. 18 is an exploded view of a direct-lit Mini-LED backlight module according to Embodiment 2 of the present disclosure.

FIG. 18 shows an exploded view of a direct-lit Mini-LED backlight module according to the embodiment. Only the differences between this embodiment and Embodiment 1 will be explained blow, and the similarities will not be repeated here.

The PCB substrate 100 adopted by the direct-lit Mini-LED backlight module of this embodiment has a spliced comb-like structure. A reflective layer is attached to the PCB substrate 100. An optical adhesive layer is provided between the Mini-LED light sources 101 and the reflective cover 200, and the Mini-LED light sources 101 and the reflective cover 200 are bonded and fixed by the optical adhesive layer.

Embodiment 3

Figure 19:
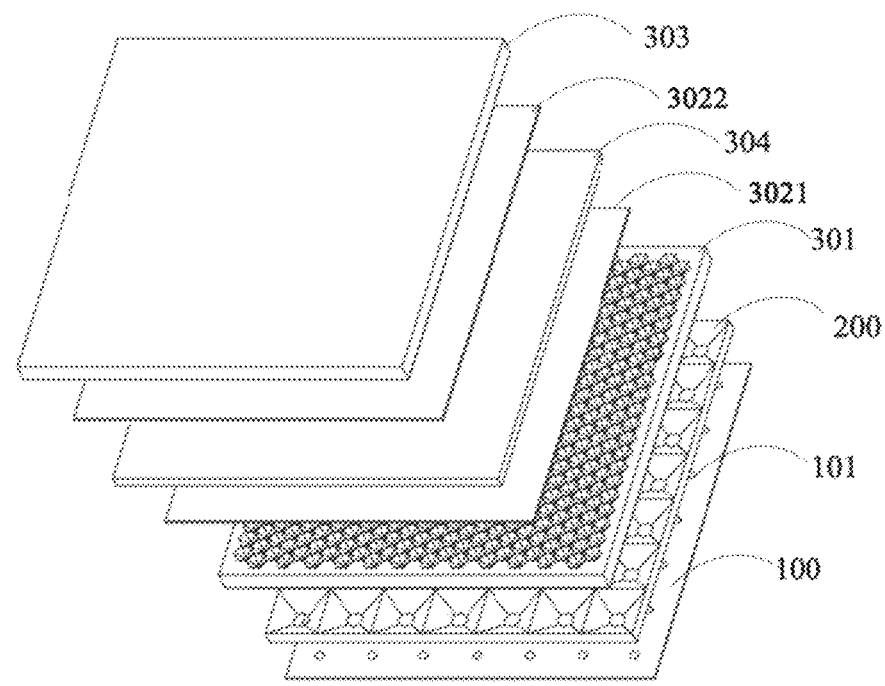
FIG. 19 is an exploded view of a direct-lit Mini-LED backlight module according to Embodiment 3 of the present disclosure.
Figure 20:
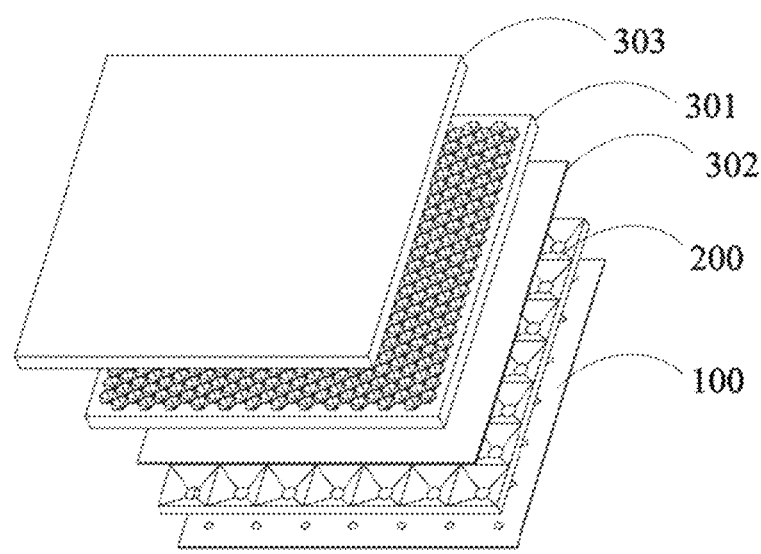
FIG. 20 is an exploded view of a direct-lit Mini-LED backlight module 4b according to Embodiment 4 of the present disclosure.

FIG. 19 shows an exploded view of a direct-lit Mini-LED backlight module according to the embodiment. Only the differences between this embodiment and Embodiment 1 will be explained below, and the similarities will not be repeated here.

The Mini-LED light sources 101 used in the direct-lit Mini-LED backlight module of this embodiment are blue light sources, and the optical diaphragm group used in this embodiment comprises two transflective diaphragms 302, one diffusion diaphragm 301, one diffusion sheet 304 and one quantum dot film 303, and the two transflective diaphragms 302 are respectively labeled as a first transflective diaphragm 3021 and a second transflective diaphragm 3022. The average reflectivity of the first transflective diaphragm 3021 for blue light is 50%, and the average reflectivity of the second transflective diaphragm 3022 for red light and green light is 72%. The diffusion sheet 304 is internally filled with diffusion particles and bubbles. The direct-lit Mini-LED backlight module provided in this embodiment is composed of the PCB substrate 100, the reflective cover 200, the diffusion diaphragm 301, the first transflective diaphragm 3021, the diffusion sheet 304, the second transflective diaphragm 3022 and the quantum dot film 303 arranged from bottom to top.

Embodiment 4

As a variant of the direct-lit Mini-LED backlight module provided in Embodiment 1, this embodiment provides two direct-lit Mini-LED backlight modules. Only the differences between this embodiment and Embodiment 1 will be explained below, and the similarities will not be repeated here.

A direct-lit Mini-LED backlight module 4a: the direct-lit Mini-LED backlight module 4a is composed of the PCB substrate 100, the reflective cover 200, the transflective diaphragm 302 and the diffusion diaphragm 301, which are sequentially attached from bottom to top, wherein the light incidence side of the diffusion diaphragm 301 is provided with microlens structures 3011 to form a microlens structure surface on the light incidence side, and the light emission side of the diffusion diaphragm 301 is a flat diaphragm surface without microlens structures 3011.

A direct-lit Mini-LED backlight module 4b: the direct-lit Mini-LED backlight module 4b is composed of the PCB substrate 100, the reflective cover 200, the transflective diaphragm 302 and the diffusion diaphragm 301, which are sequentially attached from bottom to top, wherein the light emission side of the diffusion diaphragm 301 is provided with microlens structures 3011 to form a microlens structure surface on the light emission side, and the light incidence side of the diffusion diaphragm 301 is a flat diaphragm surface without microlens structures 3011.

Embodiment 5

Figure 21:
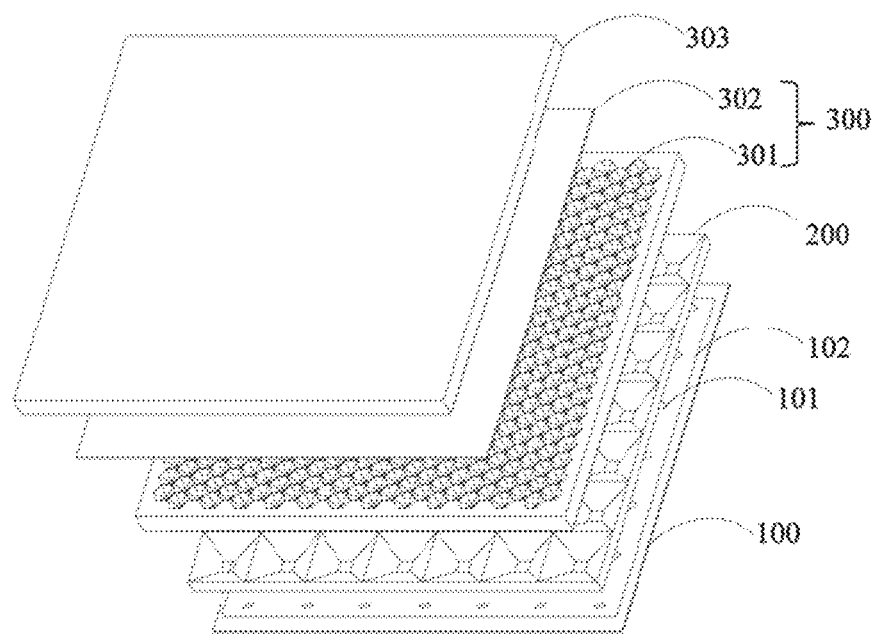
FIG. 21 is an exploded view of a direct-lit Mini-LED backlight module according to Embodiment 5 of the present disclosure.
Figure 22:
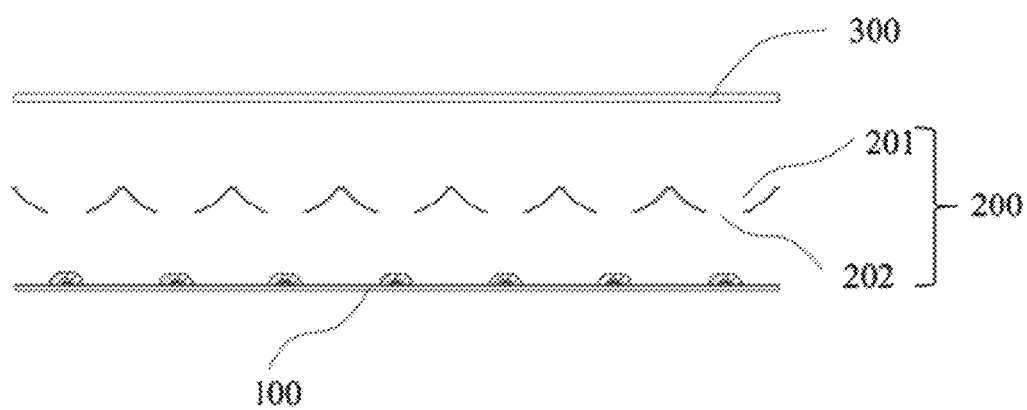
FIG. 22 is a sectional view of the direct-lit Mini-LED backlight module according to Embodiment 5 of the present disclosure.

The structure of a direct-lit Mini-LED backlight module provided in this embodiment is shown in FIGS. 21-22. Only the differences between this embodiment and Embodiment 1 will be explained below, and the similarities will not be repeated here.

An optical adhesive layer is arranged between the Mini-LED light sources 101 and the reflective cover 200. The optical adhesive layer is attached to the surface of the PCB substrate 100 and covers the Mini-LED light sources 101 to form a Fresnel lens above the Mini-LED light sources 101. The lower opening of each reflector cup structure 201 is adhered with the optical adhesive layer, so that the Mini-LED light sources 101 and the reflective cover 200 are integrally packaged and fixed by the optical adhesive layer. The Fresnel lens formed by the optical adhesive layer above the Mini-LED light sources 101 enables light near the optical axis of the Mini-LED light sources 101 to be reflected and redirected in a higher ratio.

Embodiment 6

Figure 23:
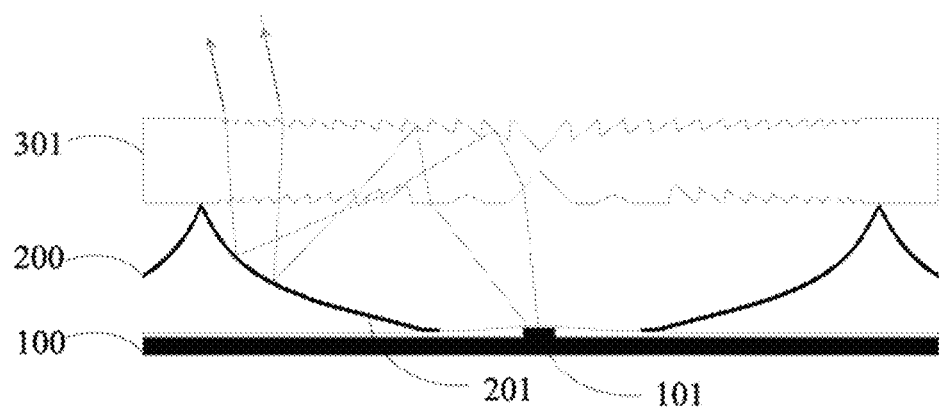
FIG. 23 is a diagram of a structure and optical principle of a diffusion diaphragm and a reflective cover of a direct-lit Mini-LED backlight module according to Embodiment 6 of the present disclosure.

FIG. 23 is a diagram of a structure and optical principle of a diffusion diaphragm 301 and a reflective cover 200 of a direct-lit Mini-LED backlight module according to the embodiment. Only the differences between this embodiment and Embodiment 1 will be explained below, and the similarities will not be repeated here.

In this embodiment, microlens structures 3011 corresponding in positions are respectively arranged on the light emission side and the light incidence side of the diffusion diaphragm 301, and a plurality of microlens structures 3011 corresponding to the same reflector cup structure 201 to form a microlens structure group. In the same microlens structure group, with the optical axis of each of the Mini-LED light sources 101 corresponding to the microlens structure group as a reference, the size of the microlens structure 3011 near the optical axis is larger than that far away from the optical axis, so that a thin film structure whose edges are thicker than the middle is formed in a region of the diffusion diaphragm where the microlens structure group is located. The film structure formed thereby is equivalent to a micro-lens structure like a double concave lens, which has a light convergence function to make the uniformly diffused area light source focus on a viewing direction, thus improving the luminance.

Embodiment 7

As a variant of the direct-lit Mini-LED backlight module provided in Embodiment 1, this embodiment provides two direct-lit Mini-LED backlight modules. Only the differences between this embodiment and Embodiment 1 will be described below, and the similarities will not be repeated here. The direct-lit Mini-LED backlight module provided in this embodiment comprises the PCB substrate 100, the reflective cover 200, the diffusion diaphragm 301 and the quantum point film 303 which are attached from bottom to top, no transflective diaphragm 302 provided.

Test Example 1

The direct-lit Mini-LED backlight modules provided in Embodiment 1, Embodiment 4 and Embodiment 7 are used for a luminance test. The specific results are shown in Tables 1-4 respectively, and the luminance uniformity of a tested product is represented by a minimum value of the ratios of the luminance values of eight test points P1-P8 to a central test point P0. The minimum luminance value of the direct-lit Mini-LED backlight module provided in Embodiment 1 appears at P5, which is 13497 nit, and the luminance uniformity is calculated according to P5/P0, which is 95%. The minimum luminance value of the direct-lit Mini-LED backlight module 4a provided in Embodiment 4 appears at P6, which is 13219 nit, and the luminance uniformity is calculated according to P6/P0, which is 95.06%. The minimum luminance value of the direct-lit Mini-LED backlight module 4b provided in Embodiment 4 appears at P8, which is 12475 nit, and the luminance uniformity is calculated according to P8/P0, which is 90.41%. The minimum luminance value of the direct-lit Mini-LED backlight module provided in Embodiment 7 appears at P8, which is 12331 nit, and the luminance uniformity is calculated according to P1/P0, which is 90.31%. According to the above test results, among tested products in this embodiment, the direct-lit Mini-LED backlight module provided in Embodiment 1 has the highest luminance, while both the direct-lit Mini-LED backlight module provided in Embodiment 1 and the direct-lit Mini-LED backlight module 4a provided in Embodiment 4 have high luminance uniformity. In contrast, the luminance value and luminance uniformity corresponding to the tested direct-lit Mini-LED backlight module 4b have obviously deteriorated, and the luminance uniformity corresponding to the direct-lit Mini-LED backlight module provided in Embodiment 7 is also obviously low, which shows that the direct compounding of the transflective diaphragm 302 in the direct-lit Mini-LED backlight module and the microlens structure surface formed on the surface of the diffusion diaphragm 301 is beneficial to the improvement of the luminance uniformity of the backlight module. The PCB substrate 100, the reflective cover 200, the diffusion diaphragm 301 (the microlens structure surface formed on the light emission side) and the transflective diaphragm 302 are sequentially compounded from bottom to top, which is more beneficial to the improvement of the luminance value of the backlight module.

TABLE 1

Luminance test data of direct-lit Mini-LED backlight module of Embodiment 1

| | Point of focus | | | | | | | | |
|---|---|---|---|---|---|---|---|---|---|
| | P0 | P1 | P2 | P3 | P4 | P5 | P6 | P7 | P8 |
| Luminance (nit) | 14166 | 13986 | 14183 | 14157 | 14019 | 13497 | 13725 | 14004 | 13761 |

TABLE 2

Luminance test data of direct-lit Mini-LED backlight module 4a of Embodiment 4

| | Point of focus | | | | | | | | |
|---|---|---|---|---|---|---|---|---|---|
| | P0 | P1 | P2 | P3 | P4 | P5 | P6 | P7 | P8 |
| Luminance (nit) | 13906 | 13768 | 13580 | 13906 | 14114 | 13928 | 13219 | 13501 | 13619 |

TABLE 3

Luminance test data of direct-lit Mini-LED backlight module 4b of Embodiment 4

| | Point of focus | | | | | | | | |
|---|---|---|---|---|---|---|---|---|---|
| | P0 | P1 | P2 | P3 | P4 | P5 | P6 | P7 | P8 |
| Luminance (nit) | 13799 | 13001 | 12998 | 13254 | 13612 | 13211 | 12999 | 13381 | 12475 |

TABLE 4

Luminance test data of direct-lit Mini-LED backlight module of Embodiment 7

| | Point of focus | | | | | | | | |
|---|---|---|---|---|---|---|---|---|---|
| | P0 | P1 | P2 | P3 | P4 | P5 | P6 | P7 | P8 |
| Luminance (nit) | 13654 | 12986 | 13015 | 13119 | 12886 | 13107 | 13417 | 12974 | 12331 |

Test Example 2

Based on the direct-lit Mini-LED backlight module provided in Embodiment 1, some variations are made to design different direct-lit Mini-LED backlight modules for an optical performance test. Only the differences between the direct-type Mini-LED backlight modules obtained by variations and Embodiment 1 will be described below, and the similarities will not be repeated here. With the form of arranging the microlens structures 3011 on the diffusion diaphragm 301 as a variable, different direct-type Mini-LED backlight modules are designed by adopting diffusion diaphragms 301 with different structures. The serial numbers of the direct-type Mini-LED backlight modules involved and the structures of the corresponding diffusion diaphragms 301 are as follows: a direct-type Mini-LED backlight module 1A, where microlens structures 3011 are arranged only on the light incidence side of the diffusion diaphragm 301; and a direct-lit Mini-LED backlight module 1B which adopts a diffusion diaphragm 301 without microlens structures 3011.

The optical performance test is conducted on the direct-lit Mini-LED backlight module provided in Embodiment 1, the direct-lit Mini-LED backlight module 1A and the direct-lit Mini-LED backlight module 1B. The results are shown in Table 5. The luminance uniformity of the direct-lit Mini-LED backlight module provided in Embodiment 1 is obviously better than that of the other two groups of tested products, without obvious bright spots or shadows. The direct-lit Mini-LED backlight module 1A is poor in luminance uniformity, and has obvious shadows and bright spots. The direct-lit Mini-LED backlight module 1B is the worst in luminance uniformity, and has serious shadows and mura, and the phenomenon of mura is hardly improved.

TABLE 5

Optical performance statistics of tested direct-lit Mini-LED backlight modules

| Tested products | Visible light transmittance on the light incidence side | Visible light transmittance on the light emission side | Luminance uniformity |
|---|---|---|---|
| Direct-lit Mini-LED backlight module in Embodiment 1 | 68% | 91% | 90% |
| Direct-lit Mini-LED backlight module 1A | 90% | 61% | 73% |
| Direct-lit Mini-LED backlight module 1B | 90% | 92% | 50% |

Test Example 3

Based on the direct-lit Mini-LED backlight module provided in Embodiment 1, some variations are made to design different direct-lit Mini-LED backlight modules for an optical performance test. Only the differences between the direct-type Mini-LED backlight modules obtained by variations and Embodiment 1 will be described below, and the similarities will not be repeated here. With the change rule of the reflectivity of the transflective diaphragm 302 as a variable, different direct-lit Mini-LED backlight modules are designed by adopting different transflective diaphragms 302. The serial numbers of the direct-lit Mini-LED backlight modules involved and the reflectivity relationships of corresponding transflective diaphragms 302 are as follows: a direct-lit Mini-LED backlight module 2A: the reflectivity of the transflective diaphragm 302 satisfies R50>R30>R10; and a direct-lit Mini-LED backlight module 2B: the reflectivity of the transflective diaphragm 302 satisfies R10=R30=R50. The optical performance test is conducted on the direct-lit Mini-LED backlight module provided in Embodiment 1, the direct-lit Mini-LED backlight module 2A and the direct-lit Mini-LED backlight module 2B. The results are shown in Table 6. The luminance uniformity of the direct-lit Mini-LED backlight module provided in Embodiment 1 is obviously better than that of the other two groups of tested products, and the other two groups of tested products both have different levels of mura and shadows. The direct-lit Mini-LED backlight module 2A has obviously partitioned bright regions and dark regions, and the luminance uniformity of the area light source is obviously poorer.

TABLE 6

Tested direct-lit Mini-LED backlight modules and optical performance statistics thereof

| Tested products | Luminance uniformity |
| --- | --- |
| Direct-lit Mini-LED backlight module in Embodiment 1 | 90% |
| Direct-lit Mini-LED backlight module 2A | 45% |
| Direct-lit Mini-LED backlight module 2B | 67% |

Although the present disclosure has been described above with reference to some embodiments, various improvements may be made and equivalents may be substituted for components thereof without departing from the scope of the present disclosure. Especially, as long as there is no structural conflict, the features in the embodiments disclosed in the present disclosure can be combined with each other in any way. The reason why these combinations are not exhaustively described in this specification is to save space and resources. Therefore, the present disclosure is not limited to the specific embodiments disclosed herein, but includes all technical solutions falling within the scope of the claims.

The invention claimed is:

1. A mura-compensable direct-lit Mini-LED backlight module, comprising a PCB substrate with a plurality of Mini-LED light sources mounted on a surface, a reflective cover provided with a plurality of reflector cup structures with upper and lower openings, and an optical diaphragm group, wherein
the PCB substrate, the reflective cover and the optical diaphragm group are sequentially arranged from bottom to top, and the Mini-LED light sources are arranged corresponding to the reflector cup structures on the reflective cover and penetrate through the lower openings of the reflector cup structures;
the optical diaphragm group comprises at least one diffusion diaphragm; and
a plurality of microlens structures are arranged on a light emission side and/or a light incidence side of the diffusion diaphragm to form a microlens structure surface;
wherein the microlens structures are recessed toward inside of the diffusion diaphragm to form recessed cavities on a surface of the diffusion diaphragm;
wherein the optical diaphragm group further comprises at least one transflective diaphragm, a reflectivity corresponding to light incident from a light incidence side of the transflective diaphragm at incident angles of 10°, 30° and 50° is R10, R30 and R50 respectively, and the transflective diaphragm satisfies R10>R30>R50.

2. The mura-compensable direct-lit Mini-LED backlight module according to claim 1, wherein the transflective diaphragm includes a transmissive layer, resin layers and a reflective layer sequentially arranged, and the resin layers are formed by laminating more than 11 thermoplastic resin layers, and a difference between refractive indices of adjacent thermoplastic resin layers is 0.01 or above in a thickness direction of the transflective diaphragm.

3. The mura-compensable direct-lit Mini-LED backlight module according to claim 2, wherein the resin layers comprise resin layers A and resin layers B, and the resin layers A and the resin layers B are alternately compounded to form the transflective diaphragm.

4. The mura-compensable direct-lit Mini-LED backlight module according to claim 1, wherein a side surface, facing the transflective diaphragm, of the diffusion diaphragm is provided with the microlens structures.

5. The mura-compensable direct-lit Mini-LED backlight module according to claim 4, wherein the transflective diaphragm is attached to the microlens structure surface of the diffusion diaphragm to realize composition of the transflective diaphragm and the diffusion diaphragm.

6. The mura-compensable direct-lit Mini-LED backlight module according to claim 4, wherein the microlens structures are arranged on the light emission side of the diffusion diaphragm so as to form the microlens structure surface on the light emission side of the diffusion diaphragm.

7. The mura-compensable direct-lit Mini-LED backlight module according to claim 1, wherein the optical diaphragm group is attached to a top of the reflective cover, so that the optical diaphragm group seals the upper openings of the reflector cup structures.

8. The mura-compensable direct-lit Mini-LED backlight module according to claim 7, wherein
in the optical diaphragm group, the diffusion diaphragm is used as a bottom diaphragm, and
a distance H between a light incidence side surface of the bottom diaphragm and an upper surface of the PCB substrate is equal to a thickness T of the reflective cover.

9. The mura-compensable direct-lit Mini-LED backlight module according to claim 8, wherein the transflective diaphragm satisfies that an average reflectivity for blue light is greater than 40%, or an average reflectivity for red light and green light is greater than 70%.

10. The mura-compensable direct-lit Mini-LED backlight module according to claim 9, wherein
the optical diaphragm group further comprises a diffusion sheet and a quantum dot film, the Mini-LED light sources are blue light sources, the transflective diaphragm comprises a first transflective diaphragm and a second transflective diaphragm, and the diffusion diaphragm, the first transflective diaphragm, the diffusion sheet, the second transflective diaphragm and the quantum dot film are sequentially laminated from bottom to top; and
the average reflectivity of the first transflective diaphragm for blue light is greater than 40%, and the average reflectivity of the second transflective diaphragm for red light and green light is greater than 70%.

11. The mura-compensable direct-lit Mini-LED backlight module according to claim 1, wherein
a bottom diaphragm of the optical diaphragm group is the transflective diaphragm, the reflective cover, and the transflective diaphragm and the diffusion diaphragm are sequentially attached from bottom to top so that the transflective diaphragm seals the upper openings of the reflector cup structures.

12. The mura-compensable direct-lit Mini-LED backlight module according to claim 1, wherein a distance between a lower surface of the optical diaphragm group and the Mini-LED light sources is H, and a minimum pitch between adjacent Mini-LED light sources is P, H:P=1:1-1:7.

13. The mura-compensable direct-lit Mini-LED backlight module according to claim 1, wherein
the microlens structures are subjected to periodic distribution corresponding to the reflector cup structures, and
the periodic distribution refers to that a plurality of microlens structures located right above the upper opening of each reflector cup structure form a microlens structure group, and the microlens structure group is used as a repeating unit of the periodic distribution.

14. The mura-compensable direct-lit Mini-LED backlight module according to claim 13, wherein
each microlens structure group corresponds to the Mini-LED light source arranged in its corresponding reflector cup structure; and
in the microlens structure group, with an optical axis of its corresponding Mini-LED light source as a central axis, distribution density of the microlens structures decreases in a radiation manner.

15. The mura-compensable direct-lit Mini-LED backlight module according to claim 13, wherein
each microlens structure group corresponds to the Mini-LED light source arranged in its corresponding reflector cup structure; and
in the microlens structure group, with an optical axis of its corresponding Mini-LED light source as a central axis, a slope of a concave inclined surface of each microlens structure increases as a distance between the microlens structure and the central axis decreases.

16. The mura-compensable direct-lit Mini-LED backlight module according to claim 13, wherein the light incidence side and the light emission side of the diffusion diaphragm are both provided with the microlens structures.

17. The mura-compensable direct-lit Mini-LED backlight module according to claim 16, wherein
each microlens structure group corresponds to the Mini-LED light source arranged in its corresponding reflector cup structure; and
in the microlens structure group, with an optical axis of its corresponding Mini-LED light source as a central axis, sizes of the microlens structures increase as a distance between the microlens structures and the central axis decreases, so that a thin film structure whose edges are thicker than middle is formed in a region of the diffusion diaphragm where the microlens structure group is located.

* * * * *